United States Patent
Matsubara et al.

(10) Patent No.: US 11,584,359 B2
(45) Date of Patent: Feb. 21, 2023

(54) CONTROL DEVICE OF HYBRID VEHICLE AND CONTROL METHOD

(71) Applicants: TOYOTA JIDOSHA KABUSHIKI KAISHA, Aichi-ken (JP); AISIN AW CO., LTD., Aichi-ken (JP)

(72) Inventors: Keigo Matsubara, Aichi-ken (JP); Nobufusa Kobayashi, Aichi-ken (JP); Tomoya Inayoshi, Aichi-ken (JP)

(73) Assignees: TOYOTA JIDOSHA KABUSHIKI KAISHA, Aichi-Ken (JP); AISIN AW CO., LTD., Aichi-Ken (JP)

( * ) Notice: Subject to any disclaimer, the term of this patent is extended or adjusted under 35 U.S.C. 154(b) by 335 days.

(21) Appl. No.: 17/033,600

(22) Filed: Sep. 25, 2020

(65) Prior Publication Data
US 2021/0094532 A1 Apr. 1, 2021

(30) Foreign Application Priority Data
Sep. 27, 2019 (JP) .............................. JP2019-177261

(51) Int. Cl.
*B60W 20/40* (2016.01)
*B60W 10/02* (2006.01)
*B60W 10/06* (2006.01)

(52) U.S. Cl.
CPC ............ *B60W 20/40* (2013.01); *B60W 10/02* (2013.01); *B60W 10/06* (2013.01);
(Continued)

(58) Field of Classification Search
CPC ...... B60W 20/40; B60W 10/02; B60W 10/06; B60W 2510/0241; B60W 2510/0638;
(Continued)

(56) References Cited

U.S. PATENT DOCUMENTS

| 2009/0017988 A1* | 1/2009 | Reuschel | .............. B60W 10/08 903/946 |
| 2014/0172213 A1* | 6/2014 | Park | ...................... B60W 10/02 903/930 |

(Continued)

FOREIGN PATENT DOCUMENTS

| JP | 2002349310 A | * 12/2002 | ............... B60K 6/48 |
| JP | 5168600 B2 | * 10/2011 | ............... B60K 6/48 |

(Continued)

*Primary Examiner* — Richard W Ridley
*Assistant Examiner* — Aimee Tran Nguyen
(74) *Attorney, Agent, or Firm* — Hauptman Ham, LLP

(57) ABSTRACT

A control device of a hybrid vehicle of the disclosure includes a clutch controller configured to perform slip control of a hydraulic clutch in response to satisfaction of a start condition of an engine and to perform pressure increase control of increasing a hydraulic pressure to the hydraulic clutch with elapse of time after a rotation speed difference between the engine and a motor enters a predetermined range; and an engine controller configured to start fuel injection and ignition of the engine before the rotation speed difference enters the predetermined range, to control the engine such that the rotation speed of the engine becomes equal to a target rotation speed after the start of the fuel injection and the ignition, and to increase the target rotation speed of the engine as an angular acceleration of the motor becomes larger during execution of the pressure increase control.

7 Claims, 7 Drawing Sheets

(52) U.S. Cl.
CPC ........... *B60W 2510/0241* (2013.01); *B60W 2510/0638* (2013.01); *B60W 2510/081* (2013.01); *B60W 2510/082* (2013.01); *B60W 2540/10* (2013.01); *B60W 2710/023* (2013.01); *B60W 2710/025* (2013.01); *B60W 2710/0644* (2013.01)

(58) Field of Classification Search
CPC ..... B60W 2510/081; B60W 2510/082; B60W 2540/10; B60W 2710/023; B60W 2710/025; B60W 2710/0644
See application file for complete search history.

(56) References Cited

U.S. PATENT DOCUMENTS

| | | | |
|---|---|---|---|
| 2014/0249710 A1* | 9/2014 | Nakanishi | F02N 99/006 180/65.265 |
| 2016/0059846 A1* | 3/2016 | Wang | B60W 10/02 180/65.265 |
| 2018/0208202 A1* | 7/2018 | Kobayashi | B60K 6/48 |

FOREIGN PATENT DOCUMENTS

| | | |
|---|---|---|
| JP | 201328304 A | 2/2013 |
| JP | 201752491 A | 3/2017 |

* cited by examiner

CONTROL DEVICE OF HYBRID VEHICLE AND CONTROL METHOD

CROSS-REFERENCE TO RELATED APPLICATION

This application claims priority to Japanese Patent Application No. 2019-177261 filed on Sep. 27, 2019, the contents of which is incorporated herein by reference.

TECHNICAL FIELD

The present disclosure relates to a control device of a hybrid vehicle that includes an engine, a motor configured to output a torque to a driving system, and a hydraulic clutch configured to connect the engine with the motor and to disconnect the engine from the motor, as well as to a control method.

BACKGROUND

A known configuration of a control device of a hybrid vehicle performs slip control of a clutch (engagement device with separating function) and starts an internal combustion engine with a torque transmitted from a rotating electrical machine via the clutch, in response to an engine start request in the state that the engine is stopped (as described in, for example, JP 2013-028304A). This control device shifts the clutch from a slip engaged state to a fully engaged state after a start of ignition control of the engine and controls the engine such as to output a reduced torque relative to a required engine output torque corresponding to a required driving force for a predetermined time period when the clutch is shifted from the slip engaged state to the fully engaged state.

SUMMARY

The control device described above reduces an increase rate of the engine rotation speed after the start of ignition control, in order to suppress an overshoot of the rotation speeds of the engine and the rotating electrical machine that are rotated integrally by the full engagement of the clutch and to suppress a stepwise change in rotational acceleration of the rotating electrical machine before and after the full engagement of the clutch. The rotation speed of the rotating electrical machine is, however, varied according to the state of the vehicle and the like. Accordingly, even when the control described above is performed, an excessive blow-up of the engine or a delay of rotation synchronization of the engine with the rotating electrical machine is likely to occur and cause a shock in the process of full engagement of the clutch.

A main object of the present disclosure is to cause a hydraulic clutch to be fully engaged, while reducing a delay of rotation synchronization of an engine with a motor and the occurrence of a shock, in the process of starting the engine with a torque transmitted from the motor via the hydraulic clutch under slip control.

The present disclosure is directed to a control device of a hybrid vehicle. The control device of a hybrid vehicle includes an engine, a motor configured to output a torque to a driving system, and a hydraulic clutch configured to connect the engine with the motor and to disconnect the engine from the motor. The control device includes a clutch controller configured to perform slip control of the hydraulic clutch in response to satisfaction of a start condition of the engine and to perform pressure increase control of increasing a hydraulic pressure to the hydraulic clutch with elapse of time after a rotation speed difference between rotation speeds of the engine and of the motor enters a predetermined range, and an engine controller configured to start fuel injection and ignition of the engine before the rotation speed difference enters the predetermined range, to control the engine such that the rotation speed of the engine becomes equal to a target rotation speed after the start of the fuel injection and the ignition, and to increase the target rotation speed of the engine as an angular acceleration of the motor becomes larger during execution of the pressure increase control by the clutch controller.

The present disclosure is also directed to a control method of hybrid vehicle that includes an engine, a motor configured to output a torque to a driving system, and a hydraulic clutch configured to connect the engine with the motor and to disconnect the engine from the motor. The control method includes starting slip control of the hydraulic clutch in response to satisfaction of a start condition of the engine, starting fuel injection and ignition of the engine before a rotation speed difference between rotation speeds of the engine and of the motor enters predetermined range, controlling the engine such that the rotation speed of the engine becomes equal to a target rotation speed after the start of the fuel injection and the ignition, and performing pressure increase control of increasing a hydraulic pressure to the hydraulic clutch with elapse of time after the rotation speed difference enters the predetermined range, and increasing the target rotation speed of the engine as an angular acceleration of the motor becomes larger during execution of the pressure increase control.

DESCRIPTION OF EMBODIMENTS

The following describes embodiments of the present disclosure with reference to drawings.

Figure 1:
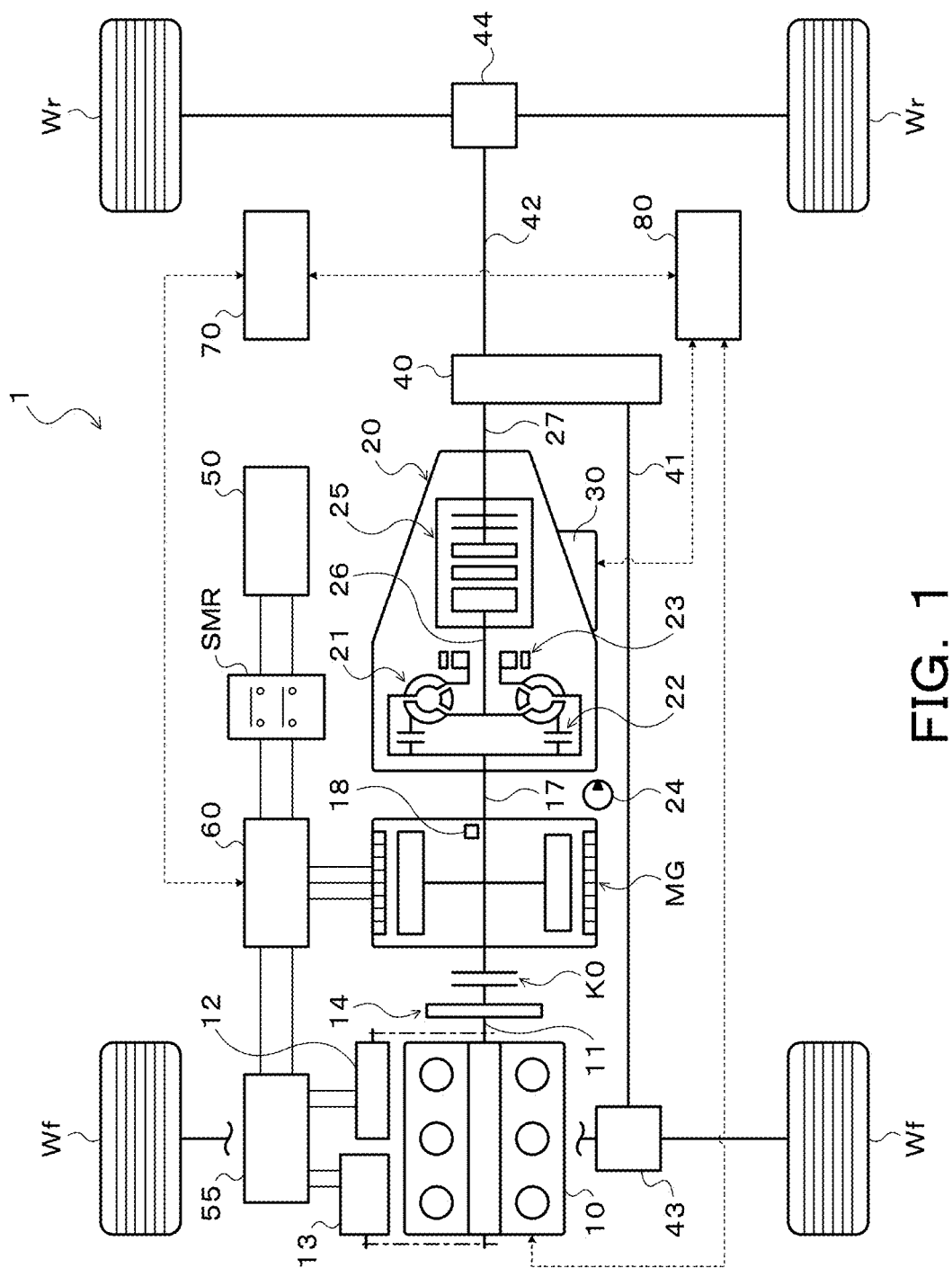
FIG. 1 is a schematic configuration diagram illustrating a hybrid vehicle that is controlled by a control device according to the present disclosure.

FIG. 1 is a schematic configuration diagram illustrating a hybrid vehicle 1 that is controlled by a control device according to the present disclosure. The hybrid vehicle 1 shown in FIG. 1 is a four-wheel drive vehicle including an engine (internal combustion engine) 10, a motor generator MG, a power transmission system 20, a transfer 40 and a hydraulic clutch K0. The hybrid vehicle 1 additionally includes a high voltage power storage device (hereinafter simply referred to as "power storage device") 50, an auxiliary machinery battery (low voltage battery) 55, a power control unit (hereinafter referred to as "PCU") 60 configured to drive the motor generator MG, a motor electronic control unit (hereinafter referred to as "MGECU") configured to control the PCU 60, and an electronic control unit (hereinafter referred to as "main ECU") 80 configured, in combination with the MGECU 70, as the control device of the present disclosure.

The engine 10 is a multi-cylinder gasoline engine configured to cause combustion of an air-fuel mixture of gasoline (hydrocarbon fuel) and the air in a plurality of combustion chambers and to convert reciprocating motions of pistons accompanied with the combustion of the air-fuel mixture into rotating motion of a crankshaft 11. As illustrated, the engine 10 includes, for example, a starter (engine starting device) 12 used for cranking of the engine 10 mainly in a cryogenic environment and an alternator 13 driven by the engine 10 to generate electric power. Furthermore, the crankshaft 11 of the engine 10 is connected with an input member of a damper mechanism 14 (for example, a flywheel damper).

The motor generator MG is a synchronous generator motor (three-phase alternating current motor) including a rotor with permanent magnets embedded therein and a stator with three-phase coils wound thereon and is configured to transmit electric power to and from the power storage device 50 via the PCU 60. The motor generator MG operates as a motor that is driven with the power from the power storage device 50 to generate a driving torque and outputs a regenerative braking torque in the process of braking the hybrid vehicle 1. The motor generator MG also operates as a generator that generates electric power by using at least part of the power from the engine 10 under load operation. As shown in FIG. 1, the rotor of the motor generator MG is fixed to a transmission shaft 17.

The power transmission system 20 includes a torque converter (hydraulic power transmission) 21 having a torque amplifying function, a lockup clutch 22, a mechanical oil pump 23, a power-driven oil pump 24, a transmission (automatic transmission) 25, and a hydraulic control device 30 configured to regulate the pressure of hydraulic oil and the like. The torque converter 21 includes a pump impeller that is connected with the transmission shaft 17 via a front cover (input member), a turbine runner that is connected with an input shaft 26 of the transmission 25, and a stator that serves to rectify the flow of the hydraulic oil flowing from the turbine runner to the pump impeller and amplitude the torque. The lockup clutch 22 is a multiple disk hydraulic friction clutch or a single disk hydraulic friction clutch that serves to connect the front cover with the input shaft 26 of the transmission 25 and disconnect the front cover from the input shaft 26.

The transmission 25 is a multiple speed transmission, for example, four-speed to ten-speed transmission and includes an input shaft 26, an output shaft 27, a plurality of planetary gears, a plurality of clutches and a plurality of brakes (engagement element for change speed). The transmission 25 causes the power transmitted from the transmission shaft 17 to the input shaft 26 via either one of the torque converter 21 and the lockup clutch 22 to be subjected to speed change into multiple different speed levels and outputs the speed-changed power from the output shaft 27. The hydraulic control device 30 includes a valve body having a plurality of oil passages formed therein, a plurality of regulator valves and a plurality of linear solenoid valves. The hydraulic control device 30 is configured to regulate the hydraulic pressure of the oil from at least one of the mechanical oil pump 23 and the power-drive oil pump 24 and supply the oil of the regulated hydraulic pressure to, for example, the torque converter 21, the lockup clutch 22 and the clutches and the brakes of the transmission 25.

The transfer 40 includes a center differential and a differential locking mechanism configured to lock the center differential (neither shown) and is configured to transmit the torque from the output shaft 27 of the transmission 25 in a distributive manner into a front-side propeller shaft 41 (first shaft) and a rear-side propeller shaft 42 (second shaft). The power that is output to the front-side propeller shaft 41 by the transfer 40 is transmitted via a front-side differential gear 43 to left and right front wheels Wf. The power that is output to the rear-side propeller shaft 42 by the transfer 40 is transmitted via a rear-side differential gear 44 to left and right rear wheels Wr.

The clutch K0 is configured to connect an output member of the damper mechanism 14, i.e., the crankshaft 11 of the engine 10, with the transmission shaft 17, i.e., the rotor of the motor generator MG and to disconnect the output member from the transmission shaft 17. According to the embodiment, the clutch K0 is a multiple disk hydraulic friction clutch (frictional engagement element) including a clutch hub that is normally connected with the output member of the damper mechanism 14, a clutch drum that is normally connected with the transmission shaft 17, a piston, a plurality of friction plates, a plurality of center plates, an engagement oil chamber which the hydraulic oil is supplied to, and an centrifugal hydraulic cancellation chamber which the hydraulic oil is supplied to. More specifically, an engagement oil pressure that is regulated by the hydraulic control device 30 described above is supplied to the engagement oil chamber of the clutch K0. A circulatory pressure that is regulated by the hydraulic control device 30 described above is supplied to the centrifugal hydraulic cancellation chamber of the clutch K0.

According to the embodiment, the clutch K0 is a normally-opened clutch that is released with a decrease in the engagement oil pressure and that is engaged with an increase in the engagement oil pressure. When the clutch K0 is engaged, the engine 10 (the crankshaft 11) is connected with the motor generator MG via the clutch K0. This causes the engine 10 to be connected with the front wheels Wf and the rear wheels Wr via the damper mechanism 14, the clutch K0, the transmission shaft 17 (the motor generator MG), the power transmission device 20, the transfer 40 and the like. The clutch K0 may be placed inside of the rotor of the motor generator MG or may be placed in an axial direction between the damper mechanism 14 and the motor generator MG.

The power storage device 50 is a lithium ion rechargeable battery or a nickel metal hydride battery having a rated output voltage of, for example, about 200 V to 300 V. The power storage device 50 may be a capacitor or may include both a secondary battery and a capacitor. The power storage device 50 is under management of a power supply management electronic control device (not shown, hereinafter referred to as "power supply management ECU") including a non-illustrated microcomputer. The power supply management ECU derives, for example, a state of charge SOC (charging rate), a target charge-discharge power Pb*, an allowable charging power Win and an allowable discharging power Wout of the power storage device 50, based on an inter-terminal voltage from a voltage sensor, a charge-discharge current from a current sensor, a battery temperature from a temperature sensor of the power storage device 50 and the like. The auxiliary machinery battery 55 is a lead acid battery having a rated output voltage of, for example, 12 V and is charged with electric power from the alternator 13 described above. The auxiliary machinery battery 55 is configured to supply electric power to auxiliary machines, such as the starter 12 of the engine 10, the power-driven oil pump 24 and the hydraulic control device 30 and a variety of ECUs.

The PCU 60 is connected with the power storage device 50 via a system main relay SMR and is also connected with the auxiliary machinery battery 55. The PCU 60 includes an inverter configured to drive the motor generator MG, a boost converter, a DC-DC converter and the like (none of them shown). The inverter includes, for example, six transistors that serve as switching elements and six diodes that are connected in a reverse direction in parallel with these transistors. The boost converter is configured to step up the voltage from the power storage device 50 and supply the stepped-up voltage to the inverter and to step down the voltage from the inverter and supply the stepped-down voltage to the power storage device 50. The DC-DC converter is configured to step down the voltage of the power from a high voltage system including the power storage device 50 and supply the power of the stepped-down voltage to a low voltage system, i.e., the auxiliary machinery battery 55, the variety of auxiliary machines, and the like.

The MGECU 70 has a microcomputer including, for example, a CPU, a ROM, a RAM and input/output interfaces (none of them are shown), various driving circuits, various logic ICs, and the like. The MGECU 70 is configured to obtain command values from the main ECU 80, a non-boosted voltage and a boosted voltage from the boost converter, a rotational position of the rotor of the motor generator MG, i.e., a rotational position of the transmission shaft 17, detected by a rotational position sensor (resolver) 18, phase currents applied to the motor generator MG, and the like. The MGECU 70 performs switching control of the inverter and the boost converter, based on these pieces of information. The MGECU 70 calculates a rotation speed Nm (rpm) of the motor generator MG (the rotor), based on the detection value of the rotational position sensor 18 and also calculates an angular velocity Wm and an angular acceleration αm of the rotor (the transmission shaft 17), at every predetermined time interval (for example, every several msec).

The main ECU 80 has a microcomputer including, for example, a CPU, a ROM, a RAM and input/output interfaces (none of them are shown), various driving circuits, various logic ICs, and the like. The main ECU 80 is configured to obtain a signal from a start switch, an accelerator position Acc (a depression amount of an accelerator pedal) detected by a non-illustrated accelerator pedal position sensor, a vehicle speed V detected by a non-illustrated vehicle speed sensor, a change gear ratio γ of the transmission 25 corresponding to the accelerator position Acc and the vehicle speed V, detection values of various sensors of the engine 10, such as a water temperature sensor and a crank angle sensor, the rotation speed Nm and the angular acceleration cm of the motor generator MG from the MGECU 70, the SOC, the target charge-discharge power Pb*, the allowable charging power Win and the allowable discharging power Wout of the power storage device 50 from the power supply management ECU, and the like. The main ECU 80 controls the engine 10, the power transmission device 20 and the clutch K0 and sets a torque command Tm* for the motor generator MG, based on these pieces of information.

Figure 2:
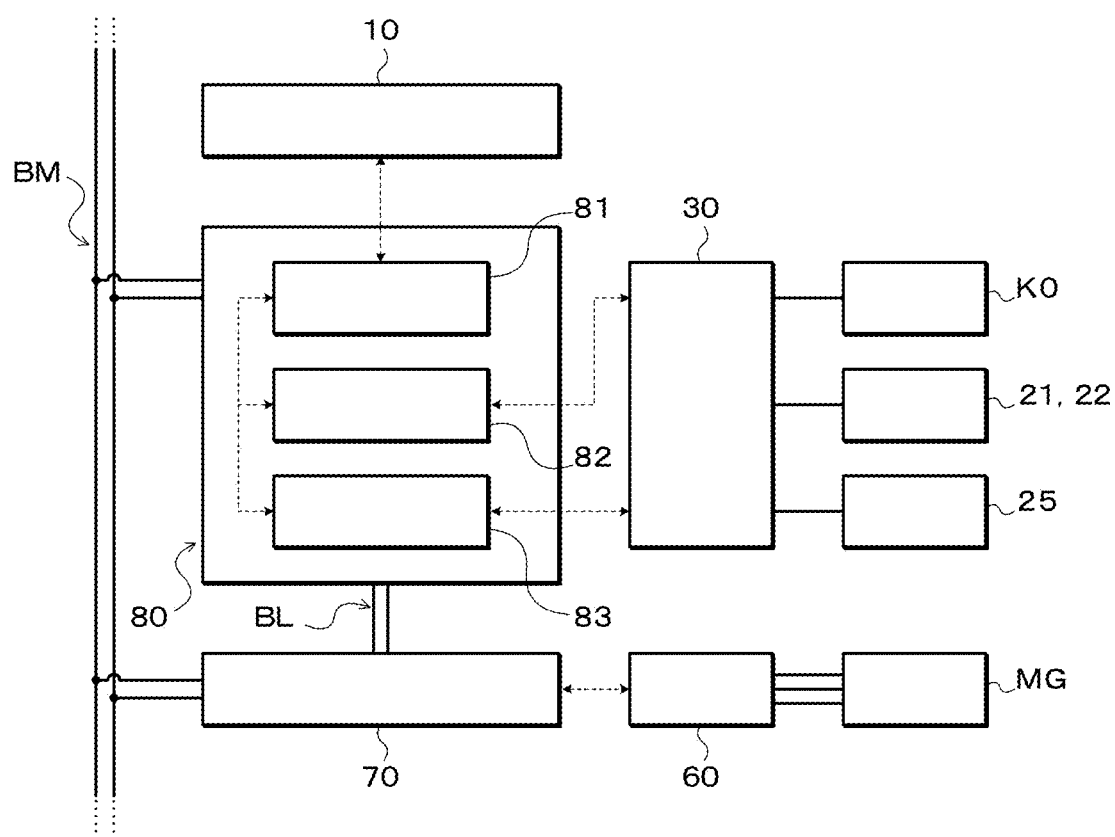
FIG. 2 is a block configuration diagram illustrating the control device of the hybrid vehicle according to the present disclosure.

According to the embodiment, as shown in FIG. 2, an engine controller 81, a clutch controller 82 and a change speed controller 83 that transmit information to and from each other are established as functional blocks (modules) in the main ECU 80 by the cooperation of a hardware configuration such as a CPU, a ROM, a RAM and logic ICs and a software configuration such as various programs installed in the ROM. The engine controller 81 performs drive control of the hybrid vehicle 1 and intake air flow control (throttle position control), fuel injection control, ignition control and the like of the engine 10. The engine controller 81 calculates a rotation speed Ne of the engine 10 (the crankshaft 11), based on the signal from the crank angle sensor and also calculates an estimated output torque $Te_{est}$ of the engine 10, based on the rotation speed Ne, an intake air flow, an amount of fuel injection, an ignition timing and the like. Furthermore, the engine controller 81 controls the auxiliary machines of the engine 10, such as the starter 12. The clutch controller 82 controls the hydraulic control device 30 such as to make the clutch K0 released, slip-engaged (half-engaged) or fully engaged according to the state of the hybrid vehicle 1. The change speed controller 83 controls the hydraulic control device 30, such that the lockup clutch 22 and the clutches and the brakes of the transmission 25 are operated according to the condition of the hybrid vehicle 1.

As shown in FIG. 2, the main ECU 80, the MGECU 70, the power supply management ECU and the like are respectively connected with a common communication line (multiple communication bus) BM that is a CAN bus including two communication lines (wire harnesses) Lo and Hi to transmit information (communication frames) to and from each other by CAN communication via the common communication line BM. Furthermore, the MGECU 70 is individually connected with the main ECU 80 via an exclusive communication line (local communication bus) BL that is a CAN bus including two communication lines Lo and Hi to transmit information (communication frames) to and from the main ECU 80 by CAN communication via the exclusive communication line BL.

In the hybrid vehicle 1 having the configuration described above, during a system stop (during parking) when no hydraulic pressure is generated by the mechanical oil pump 23 and the power-driven oil pump 24, releasing the clutch K0 disconnects the engine 10 from the transmission shaft 17, i.e., from the motor generator MG. After a system start, the hybrid vehicle 1 is started basically with a torque (power) that is output from the motor generator MG via the transmission shaft 17 to the power transmission device 20 as the driving system in the state that the clutch K0 is released.

In the process of driving the hybrid vehicle 1, the engine controller 81 of the main ECU 80 derives a required torque Tr* (including a required braking torque) that is to be output to the output shaft 27 of the transmission 25 corresponding to the accelerator position Acc and the vehicle speed V, and sets a required driving power Pd* that is required for driving the hybrid vehicle 1, based on the required torque Tr* and the rotation speed of the output shaft 27. In the case where operation of the engine 10 is stopped, the engine controller 81 sets a target power Pe*, a target rotation speed Ne* and a target torque Te* of the engine 10 to zero, and sets a torque command value Tm* in a range of the allowable charging power Win and the allowable discharging power Wout, such that a torque corresponding to the required torque Tr* is output from the motor generator MG to the output shaft 27. The torque command value Tm* is sent from the engine controller 81 to the MGECU 70. The MGECU 70 performs switching control of the inverter and the boost converter of the PCU 60, based on the torque command value Tm*.

After a system start of the hybrid vehicle 1, the engine controller 81 of the main ECU 80 determines whether an engine start condition is satisfied. The engine start condition is determined in advance in relation to the required torque Tr*, the required driving power Pd*, the target charge-discharge power Pb* and the allowable discharging power Wout of the power storage device 50, and the like. When determining satisfaction of the engine start condition, the engine controller 81 sends a clutch engagement command to the clutch controller 82. When receiving the clutch engagement command, the clutch controller 82 starts slip control of the clutch K0 or more specifically a series of control of the hydraulic control device 30 such as to provide slip engagement of the clutch K0.

After the start of the slip control of the clutch K0 by the clutch controller 82, the engine controller 81 (or the clutch controller 82) calculates a torque that balances a reaction torque from the engine 10-side that is cranked to rotate, as a cranking torque. Furthermore, the engine controller 81 sets the torque command Tm* to a sum of the cranking torque and a required driving torque that is determined from the required torque Tr* and the change gear ratio (gear ratio) of the transmission 25, and sends the torque command Tm* to the MGECU 70. When receiving the torque command Tm* from the engine controller 81, the MGECU 70 controls the PCU 60 (or more specifically, the inverters) such that at least a cranking torque to the engine 10 is output from the motor generator MG. This accordingly causes the engine 10 to be cranked with the torque transmitted from the motor generator MG via the clutch K0 that is under slip control. The cranking torque and the required driving torque described above may be separately sent from the engine controller 81 to the MGECU 70 and may be summed up on the MGECU 70-side.

Moreover, in response to satisfaction of a predetermined condition, the clutch controller 82 starts pressure increase control that increases the engagement oil pressure supplied from the hydraulic control device 30 to the clutch K0 with elapse of time, such as to fully engage the clutch K0. The engine controller 81 opens the throttle valve in response to satisfaction of the engine start condition, and starts fuel injection control and ignition control (ignition) of the engine 10 when an ignition start timing, which is determined in advance according to the state (driving state) of the hybrid vehicle 1, comes. According to the embodiment, when the rotation speed Nm of the motor generator MG (the transmission shaft 17) is equal to or higher than a predetermined rotation speed (for example, an idling rotation speed (about 1000 rpm)) (i.e., when a predetermined condition is satisfied), the fuel injection control and the ignition control are started prior to a start of the pressure increase control according to, for example, the rotation speed Nm. When the rotation speed Nm is lower than the predetermined rotation speed, on the other hand, the fuel injection control and the ignition control are started after the clutch K0 is fully engaged.

When the clutch K0 is fully engaged and the start of the engine 10 is completed by the series of processing described above, the engine controller 81 sets the target power Pe*, the target rotation speed Ne* and the target torque Te* of the engine 10, such that the engine 10 is efficiently operated, based on the required driving power Pd*, the target charge-discharge power Pb* of the power storage device 50 and the like. Furthermore, the engine controller 81 sets the torque command Tm* of the motor generator MG according to the required torque Tr* and the like within the range of the allowable charging power Win and the allowable discharging power Wout. This configuration causes the engine 10 to be operated at an operating point near to an optimum fuel consumption line and also enables the power storage device 50 to be charged with electric power generated by the motor generator MG or enables the motor generator MG to be driven with electric power from the power storage device 50 according to the SOC of the power storage device 50, such that the torque is output from both the engine 10 and the motor generator MG to the front wheels Wf and the rear wheels Wr. The hybrid vehicle 1 can thus assures the good power performance, while improving the fuel consumption of the engine 10.

Figure 3:
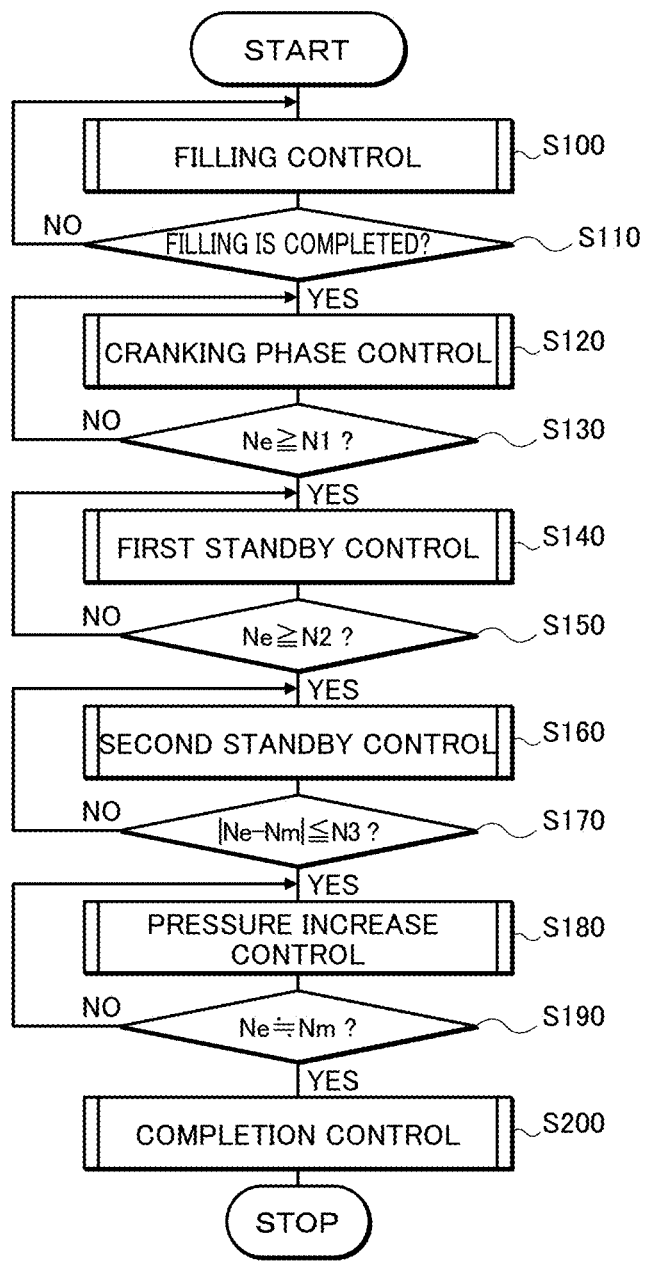
FIG. 3 is a flowchart illustrating a clutch control routine that is performed by the control device of the hybrid vehicle according to the present disclosure.
Figure 4:
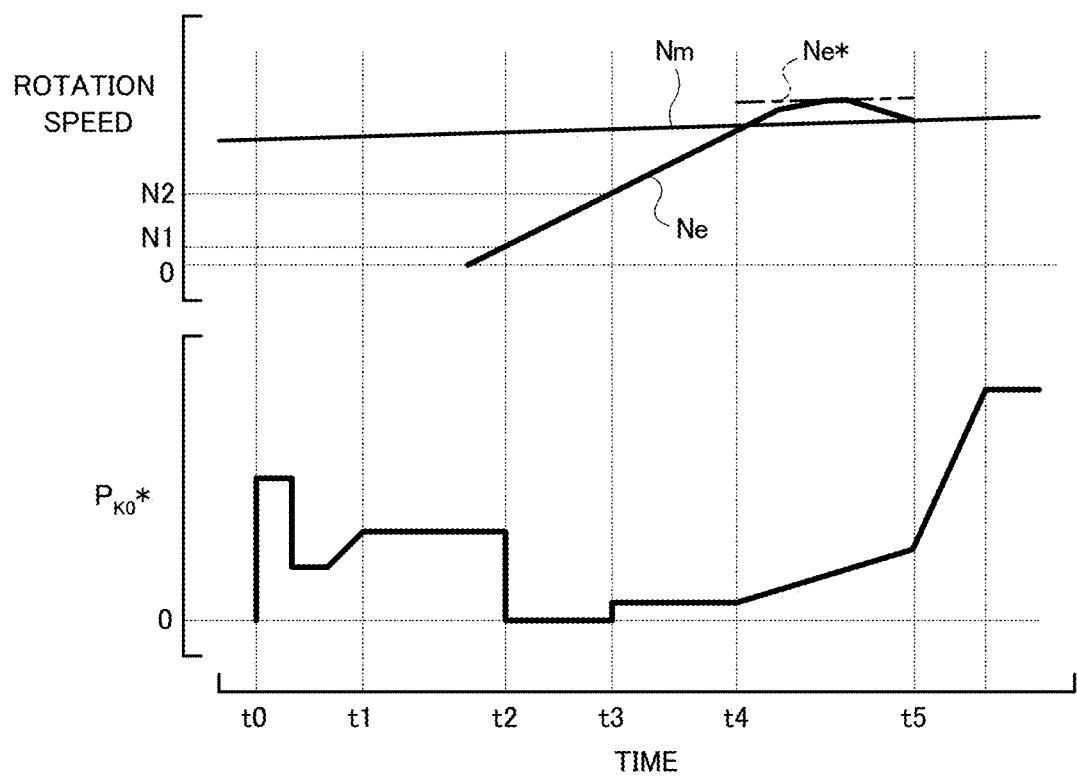
FIG. 4 is a time chart showing one example of time changes in an engagement oil pressure command value of a hydraulic clutch, a rotation speed of a motor and a rotation speed of an engine when the routine of FIG. 3 is performed.

The following describes the slip control of the clutch K0 in the process of starting the engine 10. FIG. 3 is a flowchart illustrating a clutch control routine that is performed by the clutch controller 82 of the main ECU 80 in response to satisfaction of a start condition of the engine 10. FIG. 4 is a time chart illustrating time changes in an engagement oil pressure command value $P_{K0}$* of the clutch K0, the rotation speed Nm of the motor generator MG and the rotation speed Ne of the engine 10 when the clutch control routine is performed.

As shown in FIG. 3, in response to satisfaction of the start condition of the engine 10 (at a time t0 shown in FIG. 4), the clutch controller 82 starts filling control (first fill control) in response to a clutch engagement command from the engine controller 81 (step S100). The filling control sets the engagement oil pressure command value $P_{K0}$* such as to rapidly fill the engagement oil chamber of the clutch K0 with the hydraulic oil and controls the linear solenoid valve that regulates the engagement oil pressure of the hydraulic control device 30 or more specifically of the clutch K0, based on the engagement oil pressure command value $P_{K0}$*, such that the clutch K0 falls into a state immediately before a start of slip engagement. The stage when such filling control is performed is called "filling phase".

The clutch controller 82 subsequently determines whether a determination time has elapsed since the start of the filling control (step S110). The filling control of step S100 is continuously performed until elapse of the determination time. The determination time used as a reference value at step S110 is set, for example, based on the temperature of the hydraulic oil, the cooling water temperature of the engine 10, the rotation speed Nm of the motor generator MG and the vehicle speed V. When it is determined that the determination time has elapsed and the filling has been completed (step S110: YES) (at a time t1 shown in FIG. 4), the clutch controller 82 starts cranking phase control (step S120). The cranking phase control keeps the engagement oil pressure command value $P_{K0}$* at a value required for cranking the engine 10 in the slip-engaged state of the clutch K0. The stage when such cranking phase control is performed is called "cranking phase". Such control causes the engine 10 to be cranked with the torque that is transmitted from the motor generator MG via the clutch K0 in the slip-engaged state and causes the crankshaft 11 to start rotating.

After the start of the cranking phase control, the clutch controller 82 subsequently determines whether the rotation speed Ne of the engine 10 obtained from the engine controller 81 becomes equal to or higher than a first reference value N1 (for example, about 200 rpm) (step S130). The clutch controller 82 continuously performs the cranking phase control of step S120 while the rotation speed Ne is lower than the first reference value N1. When it is determined that the rotation speed Ne becomes equal to or higher than the first reference value N1 (step S130: YES) (at a time t2 shown in FIG. 4), the clutch controller 82 starts first standby control (step S140).

The first standby control decreases the engagement oil pressure command value $P_{K0}*$ at a predetermined relatively large slope to zero or to a first standby pressure (fixed value) that is a predetermined relatively low pressure value and keeps the engagement oil pressure command value $P_{K0}*$ at the first standby pressure. Such control decreases the inertia (moment of inertia) of the crankshaft 11 that starts rotating accompanied with the slip engagement of the clutch K0 and accelerates an increase in rotation of the engine 10. The stage when such first standby control is performed is called "first standby phase". After the start of the first standby control, the clutch controller 82 determines whether the rotation speed Ne of the engine 10 obtained from the engine controller 81 becomes equal to or higher than a second reference value N2 (for example, 400 to 500 rpm) that is determined to be higher than the first reference value N1 described above (step S150). The clutch controller 82 continuously performs the first standby control of step S140 while the rotation speed Ne is lower than the second reference value N2. When it is determined that the rotation speed Ne becomes equal to or higher than the second reference value N2 (step S150: YES) (at a time t3 shown in FIG. 4), the clutch controller 82 starts second standby control (step S160).

The second standby control keeps the engagement oil pressure command value $P_{K0}*$ at a second standby pressure (fixed value) that is slightly higher than the first standby pressure described above. The stage when such second standby control is performed is called "second standby phase". After the start of the second standby control, the clutch controller 82 determines whether an absolute value of a rotation speed difference $\Delta N$ (=Ne−Nm) between the rotation speed Ne of the engine 10 obtained from the engine controller 81 and the rotation speed Nm of the motor generator MG obtained from the MGECU 70 is equal to or less than a predetermined relatively small value N3 (positive value, for example, about 400 rpm) (step S170). The clutch controller 82 continuously performs the second standby control of step S160 while the absolute value of the rotation speed difference $\Delta N$ is greater than the value N3. When it is determined that the absolute value of the rotation speed difference $\Delta N$ becomes equal to or less than the value N3 (step S170: YES) (at a time t4 shown in FIG. 4), the clutch controller 82 starts pressure increase control (step S180).

The pressure increase control increases the engagement oil pressure command value $P_{K0}*$ at a predetermined slope with elapse of time. The stage when such pressure increase control is performed is called "pressure increase phase". After the start of the pressure increase control, the clutch controller 82 determines whether the difference between the rotation speed Ne of the engine 10 obtained from the engine controller 81 and the rotation speed Nm of the motor generator MG obtained from the MGECU 70 enters a predetermined range (step S190). The clutch controller 82 continuously performs the pressure increase control of step S180, while the difference between the rotation speed Ne and the rotation speed Nm of the motor generator MG does not enter the predetermined range. When it is determined that the difference between the rotation speed Ne and the rotation speed Nm enters the predetermined range (step S190: YES) (at a time t5 shown in FIG. 4), the clutch controller 82 assumes that the clutch K0 is fully engaged and starts completion control (step S200). The completion control of step S200 increases the engagement oil pressure command value $P_{K0}*$ to a maximum pressure (for example, a line pressure) at a relatively rapid rate within a predetermined time and subsequently keeps the engagement oil pressure command value $P_{K0}*$ at the maximum pressure. The stage when such completion control is performed is called "completion phase". Such control causes the maximum pressure to be supplied to the engagement oil chamber of the clutch K0 and maintains the clutch K0 in the completely engaged state. The clutch controller 82 then terminates the routine of FIG. 3.

When the rotation speed Nm of the motor generator MG (the transmission shaft 17) is equal to or higher than a predetermined rotation speed (for example, during drive of the hybrid vehicle 1), the hybrid vehicle 1 of the embodiment starts the fuel injection control and the ignition control (ignition) of the engine 10 prior to a start of the pressure increase control described above. Especially when the rotation speed Nm of the motor generator MG is equal to or higher than the predetermined rotation speed during drive of the hybrid vehicle 1, the rotation speed Nm may vary according to the state of the hybrid vehicle 1, for example, the driver's operating state of the accelerator pedal, the SOC of the power storage device or the allowable discharging power Wout (i.e., the output limit of the motor generator MG). By taking into account the foregoing, in the hybrid vehicle 1, when the fuel injection control and the ignition control (ignition) are started prior to a start of the pressure increase control, the engine controller 81 of the main ECU 80 performs an engine control routine shown in FIG. 5 repeatedly at every predetermined time interval, for example, until completion of the pressure increase control of the clutch K0.

Figure 5:
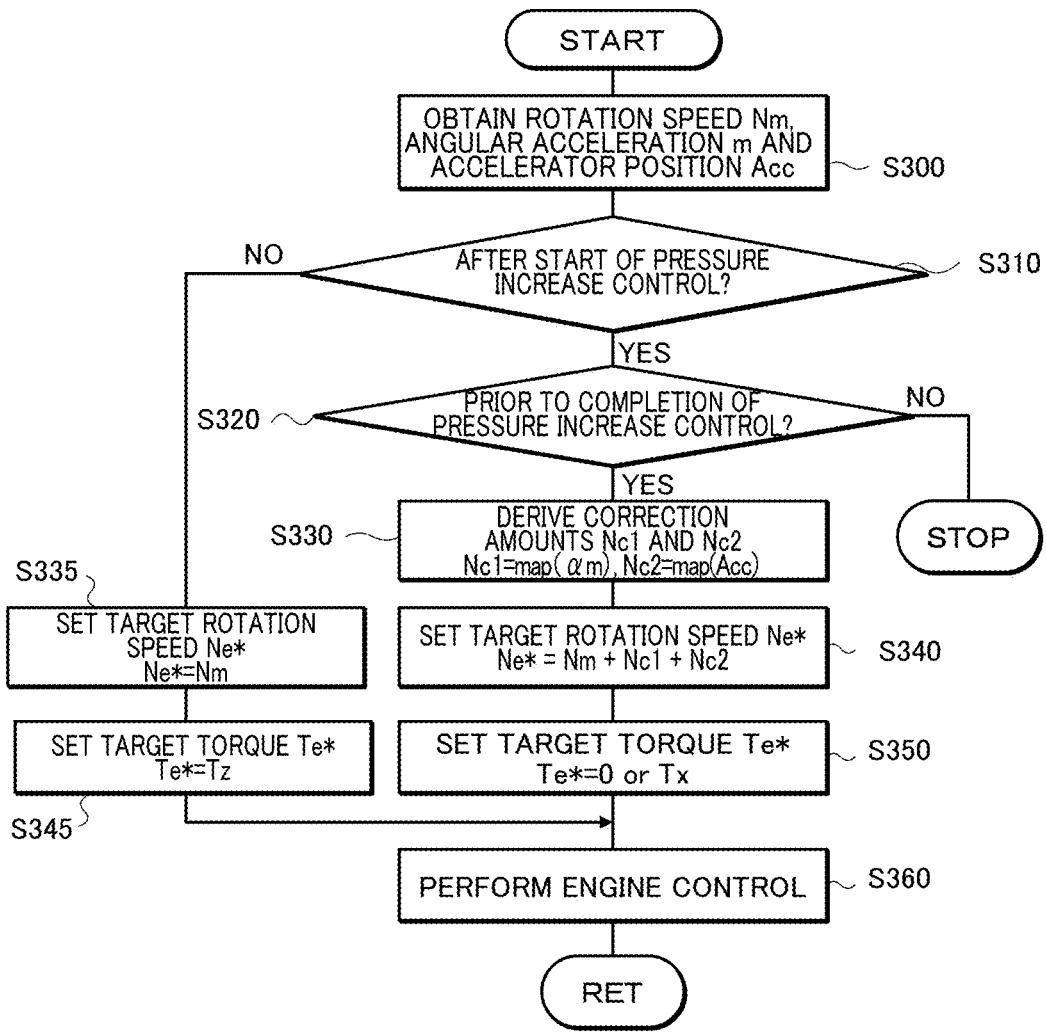
FIG. 5 is a flowchart illustrating an engine control routine that is performed by the control device of the hybrid vehicle according to the present disclosure.

When the engine control routine of FIG. 5 is triggered, the engine controller 81 obtains information required for control, the rotation speed Nm and the angular acceleration $\alpha m$ of the motor generator MG (the transmission shaft 17) calculated by the MGECU 70 and the accelerator position Acc detected by the accelerator pedal position sensor (step S300). The engine controller 81 subsequently determines whether the clutch controller 82 has started the pressure increase control of the clutch K0 (step S310).

When it is determined that the clutch controller 82 has not yet started the pressure increase control of the clutch K0 (step S310: NO), the engine controller 81 sets the target rotation speed Ne* of the engine 10 to the rotation speed Nm of the motor generator MG obtained at step S300 (step S335). The engine controller 81 also sets the target torque Te* of the engine 10 to a relatively small positive value Tz that is determined in advance by experiments and analyses (step S345). After the processing of step S345, the engine controller 81 performs the intake air flow control, the fuel injection control, the ignition control and the like, such that the rotation speed Ne of the engine 10 becomes equal to the target rotation speed Ne* and that the output torque of the engine 10 becomes equal to the target torque Te* (step S360) and then once terminates the routine of FIG. 5.

When it is determined that the clutch controller 82 has started the pressure increase control of the clutch K0 (step S310: YES), on the other hand, the engine controller 81 subsequently determines whether the present time is prior to completion of the pressure increase control of the clutch K0 (step S320). When it is determined that the present time is prior to completion of the pressure increase control of the clutch K0 (step S320: YES), the engine controller 81 derives a first correction amount (increasing correction amount) Nc1 and a second correction amount (decreasing correction amount) Nc2 relative to the target rotation speed Ne* (step S330). At step S330, the engine controller 81 derives the first correction amount Nc1 corresponding to the angular acceleration αm of the motor generator obtained at step S300 from a first correction amount setting map illustrated in FIG. 6 and derives the second correction amount Nc2 corresponding to the accelerator position Acc obtained at step S300 from a second correction amount setting map illustrated in FIG. 7.

Figure 6:
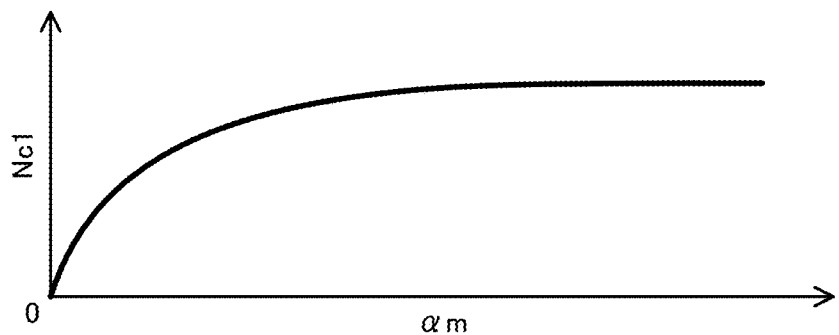
FIG. 6 is a diagram illustrating a first correction amount setting map.
Figure 7:
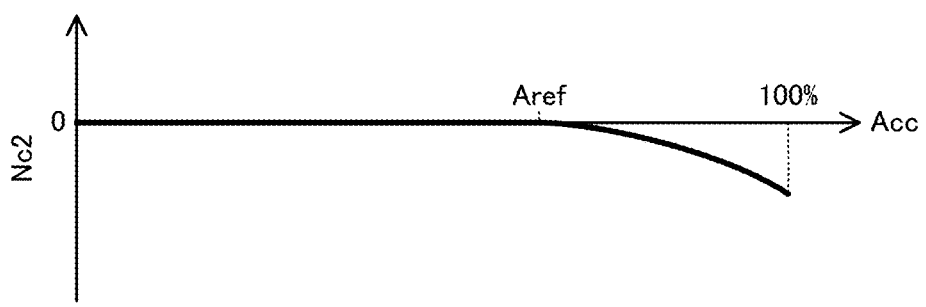
FIG. 7 is a diagram illustrating a second correction amount setting map.

As shown in FIG. 6, the first correction amount setting map is created in advance by experiments and analyses such as to increase the first correction amount Nc1 (positive value) as the angular acceleration αm of the motor generator MG becomes larger and to converge the first correction amount Nc1 to a fixed value at the angular acceleration αm equal to or greater than a predetermined value. As shown in FIG. 7, the second correction amount setting map is created in advance by experiments and analyses such as to set the second correction amount Nc2 to zero at the accelerator position Acc lower than a predetermined opening position Aref (for example, a value of about 60 to 70%) and to decrease the second correction amount Nc2 (negative value) (i.e., to increase the absolute value of the second correction amount Nc2) as the accelerator position Acc becomes larger when the accelerator position Acc is equal to or higher than the predetermined opening position Aref.

The engine controller 81 subsequently sets the target rotation speed Ne* of the engine 10 to a sum of the rotation speed Nm of the motor generator MG obtained at step S300 and the first correction amount Nc1 and the second correction amount Nc2 derived at step S330 (step S340). The engine controller 81 also sets either zero or a predetermined value Tx to the target torque Te*, such that the engine 10 is rotated at the target rotation speed Ne* (step S350). After the processing of step S350, the engine controller 81 performs the intake air flow control, the fuel injection control, the ignition control and the like, such that the rotation speed Ne of the engine 10 becomes equal to the target rotation speed Ne* and that the output torque of the engine 10 becomes equal to the target torque Te* (step S360) and then once terminates the routine of FIG. 5. When it is determined that the present time is not prior to completion of the pressure increase control of the clutch K0 (step S320: NO), on the other hand, the engine controller 81 terminates the routine of FIG. 5 and performs an engine control routine corresponding to a phase of the completely engaged clutch K0.

As a result of execution of the routine of FIG. 5 as described above, after a start of slip control of the clutch K0 including multiple phases, before the rotation speed difference ΔN between the rotation speeds of the engine 10 and of the motor generator MG enters a predetermined range including zero (−N3≤ΔN≤N3), i.e., in the case of starting the fuel injection control and the ignition control prior to a start of the pressure increase control of the clutch K0, the engine 10 is controlled such that the rotation speed Ne of the engine 10 becomes equal to the target rotation speed Ne*, i.e., the rotation speed Nm of the motor generator MG (steps S335 to S360 in FIG. 5). When the rotation speed difference ΔN between the rotation speeds of the engine 10 and of the motor generator MG enters the above predetermined range (−N3≤ΔN≤N3) and the pressure increase control of the clutch K0 is started, the target rotation speed Ne* of the engine 10 is set to increase as the angular acceleration cm of the motor generator MG becomes larger during execution of the pressure increase control and the engine 10 is controlled such that the rotation speed Ne of the engine 10 becomes equal to the target rotation speed Ne* (steps S340 to S360 in FIG. 5).

This series of control smoothly enables the clutch K0 to be fully engaged by the pressure increase control after the actual rotation speed of the engine 10 is appropriately increased to be higher than the rotation speed Nm of the motor generator MG (i.e., after the engine 10 is appropriately blown up), even when the rotation speed Nm of the motor generator MG is varied according to the driver's operating state of the accelerator pedal and the state of the power storage device 50 during the slip control of the clutch K0. More specifically, as shown in FIG. 4, in the case of a relatively low angular acceleration αm of the motor generator MG, an increment of the target rotation speed Ne* relative to the rotation speed Nm of the motor generator MG becomes relatively small according to the angular acceleration αm. Accordingly, in the case where the motor generator MG has a small variation in rotation during the slip control of the clutch K0, this configuration suppresses the engine 10 from being excessively blown up and favorably reduces a delay of rotation synchronization of the engine 10 with the motor generator MG and a shock that is likely to occur in the process of completely engaging the clutch K0.

Figure 8:
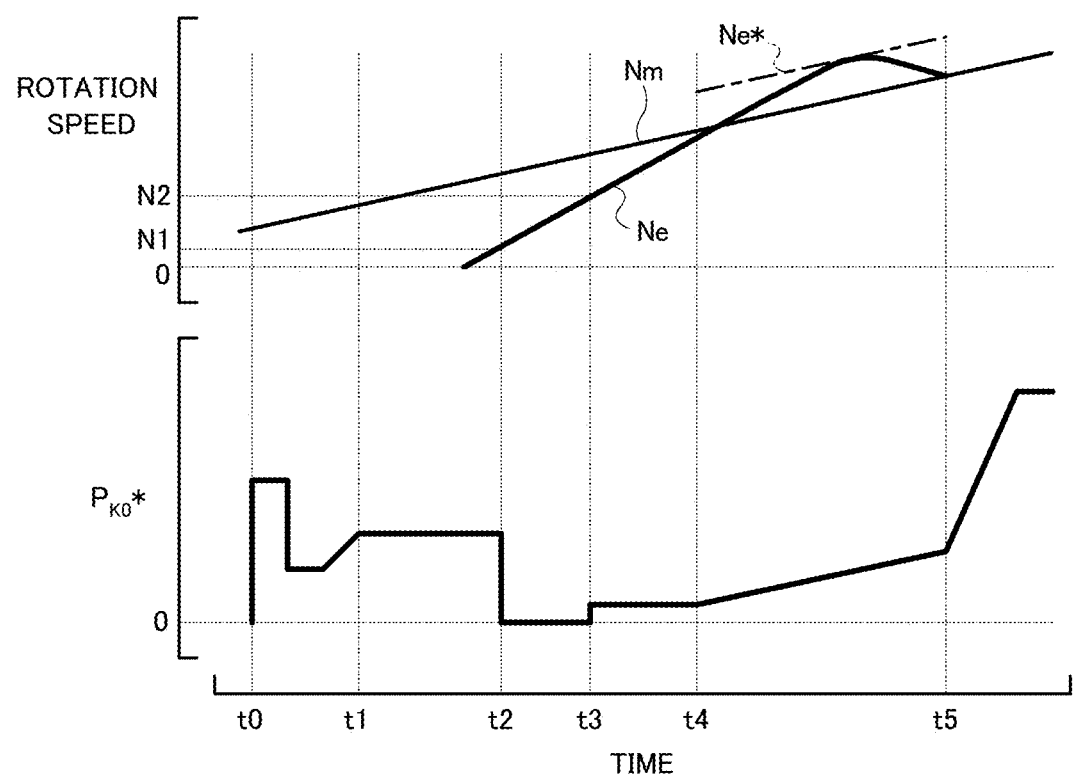
FIG. 8 is a time chart showing another example of the time changes in the engagement oil pressure command value of the hydraulic clutch, the rotation speed of the motor and the rotation speed of the engine when the routine of FIG. 3 is performed.

As shown in FIG. 8, in the case of a relatively high angular acceleration αm of the motor generator MG, on the other hand, the increment of the target rotation speed Ne* relative to the rotation speed Nm of the motor generator MG becomes relatively large according to the angular acceleration αm. Accordingly, in the case where the rotation speed Nm of the motor generator MG is increased during the slip control of the clutch K0, this configuration causes the engine 10 to be appropriately blown up with the rotation of the motor generator MG and favorably reduces a delay of rotation synchronization of the engine 10 with the motor generator MG and a shock that is likely to occur in the process of completely engaging the clutch K0. As a result, the hybrid vehicle 1 enables the clutch K0 to be fully engaged, while reducing a delay of rotation synchronization of the engine 10 with the motor generator MG and the occurrence of a shock, in the process of starting the engine 10 with the torque transmitted from the motor generator MG via the clutch K0 under the slip control.

Furthermore, in the hybrid vehicle 1, the target rotation speed Ne* of the engine 10 is set to the sum of the rotation speed Nm of the motor generator MG, the first correction amount Nc1 based on the angular acceleration αm and the second correction amount Nc2 based on the accelerator position Acc during execution of the pressure increase control of the clutch K0. When the accelerator position Acc becomes equal to or higher than the predetermined opening position Aref during execution of the pressure increase control, the second correction amount Nc2 decreases (i.e., the absolute value of the second correction amount Nc2 increases) as the accelerator position Acc becomes larger. This configuration enables the target rotation speed Ne* of the engine 10 during execution of the pressure increase control of the clutch K0 to be appropriately set according to both the variation in rotation of the motor generator MG and the driver's acceleration request.

More specifically, the target rotation speed Ne* of the engine 10 when the accelerator position Acc becomes equal to or higher than the predetermined opening position Aref during execution of the pressure increase control of the clutch K0 is lower than the target rotation speed Ne* of the engine 10 when the accelerator position Acc is lower than the predetermined opening position Aref by a value corresponding to the accelerator position Acc (i.e., the absolute value of the second correction value Nc2). This configuration is likely to cause a slight shock in the process of starting the engine 10 during drive of the hybrid vehicle 1. This configuration, however, quickly enables the clutch K0 to be fully engaged in response to the driver's acceleration request and enables the torque from the engine 10 to be transmitted to the power transmission device 20.

The engine 10 of the hybrid vehicle 1 described above may be a diesel engine or an LPG engine. The hybrid vehicle 1 may be a front-wheel-drive vehicle or a rear-wheel-drive vehicle without the transfer 40 and the like. The clutch K0 may be a single disk hydraulic friction clutch. Furthermore, a clutch may be placed between the rotor of the motor generator MG and the transmission shaft 17 to couple and separate the rotor with and from the transmission shaft 17. The transmission 25 of the power transmission device 20 may be a continuously variable transmission or a dual clutch transmission. Moreover, according to the embodiment, the engine controller 81, the clutch controller 82 and the change speed controller 83 are established in an identical ECU. This configuration is, however, not essential. According to a modification, the engine controller 81, the clutch controller 82 and the change speed controller 83 (or respective functions thereof) may be established in a plurality of different ECUs in a distributed manner.

As described above, the control device of a hybrid vehicle of the present disclosure includes an engine, a motor configured to output a torque to a driving system, and a hydraulic clutch configured to connect the engine with the motor and to disconnect the engine from the motor. The control device includes a clutch controller configured to perform slip control of the hydraulic clutch in response to satisfaction of a start condition of the engine and to perform pressure increase control of increasing a hydraulic pressure to the hydraulic clutch with elapse of time after a rotation speed difference between rotation speeds of the engine and of the motor enters a predetermined range, and an engine controller configured to start fuel injection and ignition of the engine before the rotation speed difference enters the predetermined range, to control the engine such that the rotation speed of the engine becomes equal to a target rotation speed after the start of the fuel injection and the ignition, and to increase the target rotation speed of the engine as an angular acceleration of the motor becomes larger during execution of the pressure increase control by the clutch controller.

The control device of the hybrid vehicle according to this aspect of the present disclosure starts slip control of the hydraulic clutch in response to satisfaction of the start condition of the engine, starts fuel injection and ignition of the engine before the rotation speed difference between the rotation speed of the engine and of the motor enters the predetermined range, and controls the engine such that the rotation speed of the engine becomes equal to the target rotation speed after the start of the fuel injection and the ignition. Furthermore, the control device performs pressure increase control of increasing the hydraulic pressure to the hydraulic clutch with elapse of time after the rotation speed difference between the rotation speeds of the engine and of the motor enters the above predetermined range, and increases the target rotation speed of the engine as the angular acceleration of the motor becomes larger during execution of the pressure increase control. Even when the rotation speed of the motor is varied according to the state of the vehicle and the like during the slip control of the hydraulic clutch, this configuration smoothly enables the hydraulic clutch to be fully engaged by the pressure increase control after the actual rotation speed of the engine is appropriately increased to be higher than the rotation speed of the motor (i.e., after the engine is appropriately blown up). As a result, this configuration enables the hydraulic clutch to be fully engaged, while reducing a delay of rotation synchronization of the engine with the motor and the occurrence of a shock, in the process of starting the engine with a torque transmitted from the motor via the hydraulic clutch under slip control.

In the control device of the hybrid vehicle of the above aspect, when an accelerator position becomes equal to or higher than a predetermined opening position during execution of the pressure increase control by the clutch controller, the engine controller may decrease the target rotation speed by a value corresponding to the accelerator position. This configuration quickly enables the hydraulic clutch to be fully engaged in response to the driver's acceleration request and enables a torque from the engine to be transmitted to the driving system in the process of starting the engine during drive of the hybrid vehicle.

In the control device of the hybrid vehicle of the above aspect, during execution of the pressure increase control, the engine controller may set an increasing correction amount of the target rotation speed such as to increase as the angular acceleration of the motor becomes larger and sets the target rotation speed to a sum of the rotation speed of the motor and the increasing correction amount. This configuration enables the target rotation speed of the engine to be appropriately set according to a variation in rotation of the motor.

In the control device of the hybrid vehicle of the above aspect, when an accelerator position becomes equal to or higher than a predetermined opening position during execution of the pressure increase control, the engine controller may set a decreasing correction amount of the target rotation speed such as to increase as the accelerator position becomes larger and sets the target rotation speed to a sum of the rotation speed of the motor, the increasing correction amount and the decreasing correction amount. This configuration enables the target rotation speed of the engine during execution of the pressure increase control to be appropriately set according to both a variation in rotation of the motor and the driver's acceleration request.

The control device of the hybrid vehicle of the above aspect may further include a motor controller configured to control the motor such as to output at least a cranking torque to the engine, in response to satisfaction on the start condition of the engine.

Furthermore, the control device of the hybrid vehicle of the above aspect, the driving system may include a fluid transmission device, a lockup clutch, and a transmission that is connected with the motor via at least one of the fluid transmission device and the lockup clutch.

In the control method of a hybrid vehicle of the above aspect, the hybrid vehicle includes an engine, a motor configured to output a torque to a driving system, and a hydraulic clutch configured to connect the engine with the motor and to disconnect the engine from the motor. The control method includes starting slip control of the hydraulic clutch in response to satisfaction of a start condition of the engine, starting fuel injection and ignition of the engine before a rotation speed difference between rotation speeds of the engine and of the motor enters predetermined range, controlling the engine such that the rotation speed of the engine becomes equal to a target rotation speed after the start of the fuel injection and the ignition, and performing pressure increase control of increasing a hydraulic pressure to the hydraulic clutch with elapse of time after the rotation speed difference enters the predetermined range, and increasing the target rotation speed of the engine as an angular acceleration of the motor becomes larger during execution of the pressure increase control.

This method enables the hydraulic clutch to be fully engaged, while reducing a delay of rotation synchronization of the engine with the motor and the occurrence of a shock, in the process of starting the engine with a torque transmitted from the motor via the hydraulic clutch under slip control.

The aspects of the present disclosure are not limited at all to the embodiments described above but may be modified, changed and altered in various ways within the extended scope of the present disclosure. The embodiments of the present disclosure are provided to illustrate the concrete examples of the aspects of the present disclosure described in Summary and are not intended to limit the features of the present disclosure described in Summary.

INDUSTRIAL APPLICABILITY

The disclosure is applicable to, for example, the manufacturing industries of hybrid vehicles.

The invention claimed is:

1. A control device of a hybrid vehicle that includes an engine, a motor configured to output a torque to a driving system, and a hydraulic clutch configured to connect the engine with the motor and to disconnect the engine from the motor, the control device comprising:
 a clutch controller configured to perform slip control of the hydraulic clutch in response to satisfaction of a start condition of the engine and to perform pressure increase control of increasing a hydraulic pressure to the hydraulic clutch with elapse of time after a rotation speed difference between rotation speeds of the engine and of the motor enters a predetermined range; and
 an engine controller configured to start fuel injection and ignition of the engine before the rotation speed difference enters the predetermined range, to control the engine such that the rotation speed of the engine becomes equal to a target rotation speed after the start of the fuel injection and the ignition, and to increase the target rotation speed of the engine as an angular acceleration of the motor becomes larger during execution of the pressure increase control by the clutch controller.

2. The control device of the hybrid vehicle according to claim 1,
 wherein the engine controller decreases the target rotation speed by a value corresponding to the accelerator position when an accelerator position becomes equal to or higher than a predetermined opening position during execution of the pressure increase control by the clutch controller.

3. The control device of the hybrid vehicle according to claim 1,
 wherein during execution of the pressure increase control, the engine controller sets an increasing correction amount of the target rotation speed such as to increase as the angular acceleration of the motor becomes larger and sets the target rotation speed to a sum of the rotation speed of the motor and the increasing correction amount.

4. The control device of the hybrid vehicle according to claim 3,
 wherein when an accelerator position becomes equal to or higher than a predetermined opening position during execution of the pressure increase control, the engine controller sets a decreasing correction amount of the target rotation speed such as to increase as the accelerator position becomes larger and sets the target rotation speed to a sum of the rotation speed of the motor, the increasing correction amount and the decreasing correction amount.

5. The control device of the hybrid vehicle according to claim 1, further comprising:
 a motor controller configured to control the motor such as to output at least a cranking torque to the engine, in response to satisfaction on the start condition of the engine.

6. The control device of the hybrid vehicle according to claim 1,
 wherein the driving system includes a fluid transmission device, a lockup clutch, and a transmission that is connected with the motor via at least one of the fluid transmission device and the lockup clutch.

7. A control method of a hybrid vehicle that includes an engine, a motor configured to output a torque to a driving system, and a hydraulic clutch configured to connect the engine with the motor and to disconnect the engine from the motor, the control method comprising:
 starting slip control of the hydraulic clutch in response to satisfaction of a start condition of the engine;
 starting fuel injection and ignition of the engine before a rotation speed difference between rotation speeds of the engine and of the motor enters predetermined range;
 controlling the engine such that the rotation speed of the engine becomes equal to a target rotation speed after the start of the fuel injection and the ignition; and
 performing pressure increase control of increasing a hydraulic pressure to the hydraulic clutch with elapse of time after the rotation speed difference enters the predetermined range, and increasing the target rotation speed of the engine as an angular acceleration of the motor becomes larger during execution of the pressure increase control.

* * * * *